(12) United States Patent
Wang et al.

(10) Patent No.: US 10,990,508 B2
(45) Date of Patent: Apr. 27, 2021

(54) COMPUTING SYSTEM WITH GUI TESTING DEVICE AND RELATED METHODS

(71) Applicant: Citrix Systems, Inc., Fort Lauderdale, FL (US)

(72) Inventors: Yang Wang, Nanjing (CN); Wei Luo, Nanjing (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 147 days.

(21) Appl. No.: 16/171,688

(22) Filed: Oct. 26, 2018

(65) Prior Publication Data

US 2020/0133824 A1    Apr. 30, 2020

(51) Int. Cl.
*G06F 9/44* (2018.01)
*G06F 11/36* (2006.01)
*G06K 9/34* (2006.01)
*G06F 8/38* (2018.01)

(52) U.S. Cl.
CPC ............ *G06F 11/3664* (2013.01); *G06F 8/38* (2013.01); *G06F 11/3612* (2013.01); *G06F 11/3688* (2013.01); *G06K 9/344* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 8,826,084 B1 * | 9/2014 | Gauf ................... | G06F 11/3688 714/32 |
| 9,176,744 B2 | 11/2015 | Lee | |
| 9,372,675 B1 * | 6/2016 | Pescosolido ............ | G06F 9/451 |
| 9,538,345 B2 | 1/2017 | Sah et al. | |
| 2005/0076291 A1 * | 4/2005 | Yee ........................ | G06F 16/958 715/234 |
| 2011/0074574 A1 * | 3/2011 | Becker .................... | G06F 9/454 704/2 |
| 2011/0231823 A1 * | 9/2011 | Frye ..................... | G06F 11/3688 717/125 |
| 2018/0067845 A1 * | 3/2018 | Costello, Jr. ........ | G06F 11/3696 |
| 2018/0217923 A1 * | 8/2018 | Rossler ............... | G06F 11/3684 |

* cited by examiner

*Primary Examiner* — Qamrun Nahar
(74) *Attorney, Agent, or Firm* — Allen, Dyer, Doppelt + Gilchrist, PA

(57) ABSTRACT

A computing system may include a client computing device configured to execute a software application with an associated GUI. The GUI includes fields, and each field is to hold a text string. The computing system may include a GUI testing device in communication with the client computing device and configured to execute a testing framework for interacting with the software application to generate versions of the GUI, each of the versions being in a different language, and defining expected text strings in the fields. The GUI testing device may be configured to extract the fields from the versions of the GUI, perform OCR processing on the fields to generate actual text strings, and compare the actual text strings with the expected text strings.

24 Claims, 5 Drawing Sheets

COMPUTING SYSTEM WITH GUI TESTING DEVICE AND RELATED METHODS

BACKGROUND

Mobile communication systems continue to grow in popularity and have become an integral part of both personal and business communications. Various client computing devices now incorporate various features, such as calendars, address books, task lists, calculators, memo and writing programs, media players, games, etc. These multi-function devices usually allow electronic mail (email) messages to be sent and received wirelessly, as well as access the Internet via a cellular network and/or a wireless local area network (WLAN), for example.

Each of these features in the client computing device is typically provided by a respective software application. Development of a software application for a client computing device may be challenging due to the varying parameters of the end user environment. For example, processing power and display resolution can vary widely depending on the client computing device type.

A consideration when designing software applications for client computing devices is providing an easy to use graphical user interface (GUI). This can be of particular importance in mobile applications, which have limited screen real estate. Given the varying screen resolutions and additional user customizations to the operating system (OS) interface, this can be challenging. To aid in this effort, client computing device OS providers have developed testing framework applications for designers. The testing framework applications may provide an easy interface to test client computing device applications, and perform multiple iterations of interactions with the software application under development.

SUMMARY

Generally, a computing system may include a client computing device configured to execute a software application with an associated GUI. The GUI may include a plurality of fields, each field to hold a text string. The computing system may also include a GUI testing device in communication with the client computing device and configured to execute a testing framework for interacting with the software application to generate a plurality of versions of the GUI, each of the plurality of versions being in a different spoken communication language, and defining a plurality of expected text strings in the plurality of fields. The GUI testing device may be configured to extract the plurality of fields from the plurality of versions of the GUI, perform optical character recognition (OCR) processing on the plurality of fields to generate a plurality of actual text strings, and compare the plurality of actual text strings with the plurality of expected text strings. Advantageously, the GUI testing device may identify problematic fields in the GUI of the software application.

In particular, the GUI testing device may be configured to flag a given field when a given actual text string is greater than a given expected text string by a first threshold percentage. Also, the GUI testing device may be configured to flag a given field when the given actual text string is less than the given expected text string by a second threshold percentage.

In some embodiments, the GUI testing device may be configured to, for each version of the GUI, extract, and perform OCR processing on each actual text string sequentially. In other embodiments, the GUI testing device may be configured to, for each version of the GUI, extract, and perform OCR processing concurrently on the plurality of actual text strings in the plurality of fields. The GUI testing device may be configured to, for each version of the GUI, generate a screenshot of a respective version of the GUI.

The GUI testing device may be configured to perform image pre-processing on the extracted plurality of fields from the plurality of versions of the GUI. For example, the image pre-processing may include at least one of a resizing process, a deblurring process, a gray processing, and a border setting process.

Optionally, the GUI testing device may include a first computing device, and a second computing device separate from and in communication with the first computing device. The first computing device may be configured to execute the testing framework, extract the plurality of fields, and compare plurality of actual text strings with the plurality of expected text strings. The second computing device may be configured to perform the OCR processing on the plurality of fields. The testing framework may include at least one of XCUITest, UIAutomator, and Selenium.

Another aspect is directed to a GUI testing device in communication with a software application with an associated GUI. The GUI may include a plurality of fields, each field to hold a text string. The GUI testing device may comprise a processor and a memory cooperating therewith and configured to execute a testing framework for interacting with the software application to generate a plurality of versions of the GUI, each of the plurality of versions being in a different language, and defining a plurality of expected text strings in the plurality of fields. The processor and memory are configured to extract the plurality of fields from the plurality of versions of the GUI, perform OCR processing on the plurality of fields to generate a plurality of actual text strings, and compare the plurality of actual text strings with the plurality of expected text strings.

Another aspect is directed to a method for operating a GUI testing device communicating with a software application being executed with an associated GUI. The GUI may include a plurality of fields, each field to hold a text string. The method may include executing a testing framework for interacting with the software application to generate a plurality of versions of the GUI, each of the plurality of versions being in a different language, and defining a plurality of expected text strings in the plurality of fields. The method also may include extracting the plurality of fields from the plurality of versions of the GUI, performing OCR processing on the plurality of fields to generate a plurality of actual text strings, and comparing the plurality of actual text strings with the plurality of expected text strings.

Yet another aspect is directed to a non-transitory computer-readable medium for a GUI testing device in communication with a software application being executed with an associated GUI. The GUI may include a plurality of fields, each field to hold a text string. The non-transitory computer-readable medium has computer-executable instructions for causing the GUI testing device to perform the above steps.

DETAILED DESCRIPTION

Figure 1:
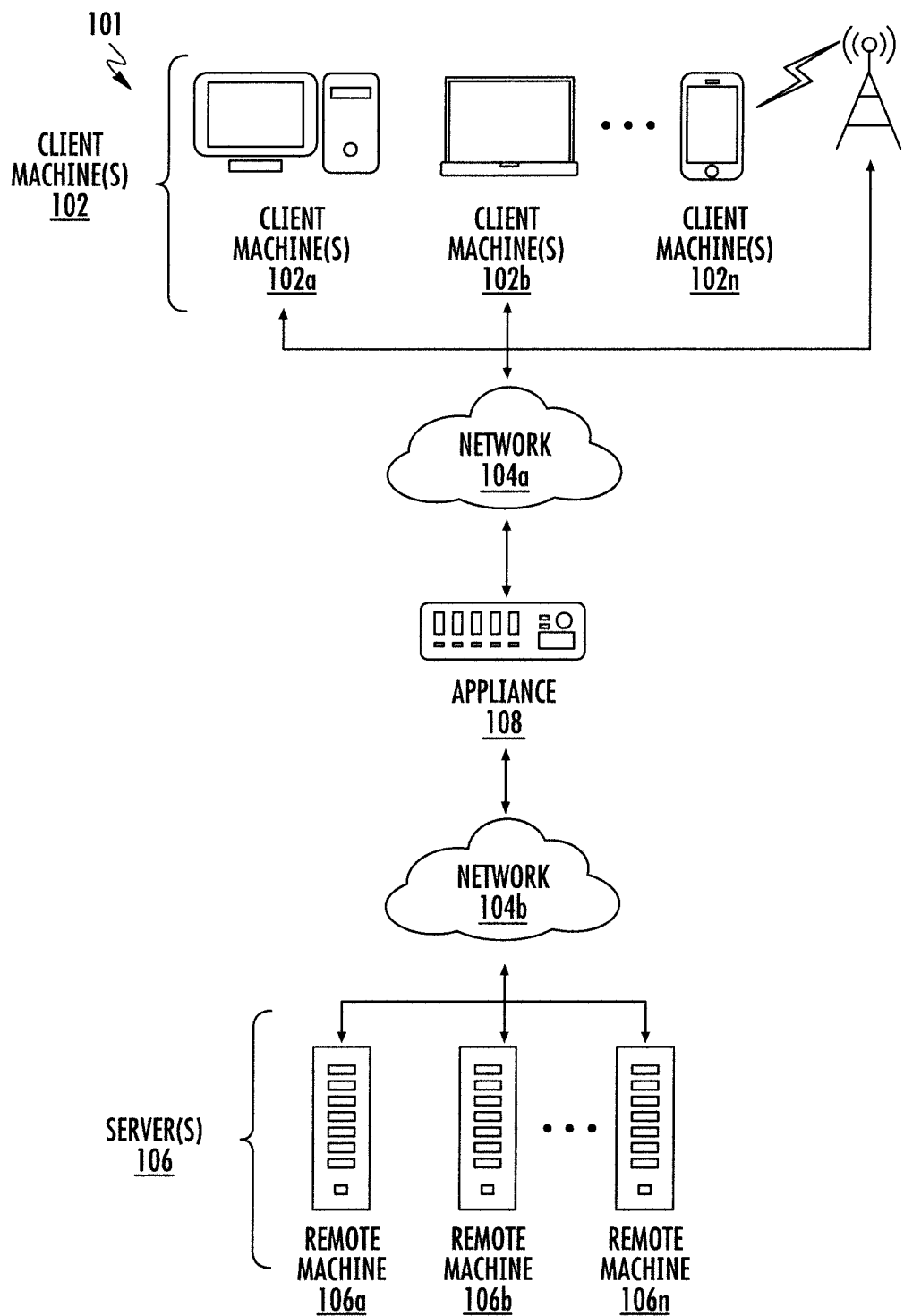
FIG. 1 is a schematic block diagram of a network environment of computing devices in which various aspects of the disclosure may be implemented.

The present description is made with reference to the accompanying drawings, in which example embodiments are shown. However, many different embodiments may be used, and thus the description should not be construed as limited to the particular embodiments set forth herein. Like numbers refer to like elements throughout, and base 100 reference numerals are used to indicate similar elements in alternative embodiments.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Referring initially to FIG. 1, a non-limiting network environment 101 (i.e. a communication system) in which various aspects of the disclosure may be implemented includes one or more client machines 102a-102n, one or more remote machines 106a-106n, one or more networks 104a, 104b, and one or more appliances 108 installed within the computing environment 101. The client machines 102a-102n communicate with the remote machines 106a-106n via the networks 104a, 104b.

In some embodiments, the client machines 102a-102n communicate with the remote machines 106a-106n via an intermediary appliance 108. The illustrated appliance 108 is positioned between the networks 104a, 104b and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104a and/or 104b.

The client machines 102a-102n may be generally referred to as client machines 102, local machines 102, clients 102, client nodes 102, client computers 102, client devices 102, computing devices 102, endpoints 102, or endpoint nodes 102. The remote machines 106a-106n may be generally referred to as servers 106 or a server farm 106. In some embodiments, a client device 102 may have the capacity to function as both a client node seeking access to resources provided by a server 106 and as a server 106 providing access to hosted resources for other client devices 102a-102n. The networks 104a, 104' may be generally referred to as a network 104a. The networks 104a may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102. In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104a may be: a local-area network (LAN); a metropolitan area network (MAN); a wide area network (WAN); a primary public network 104a; and a primary private network 104a. Additional embodiments may include a network 104a of mobile telephone networks that use various protocols to communicate among mobile devices. For short range communications within a WLAN, the protocols may include IEEE 802.11, Bluetooth, and Near Field Communication (NFC).

Figure 2:
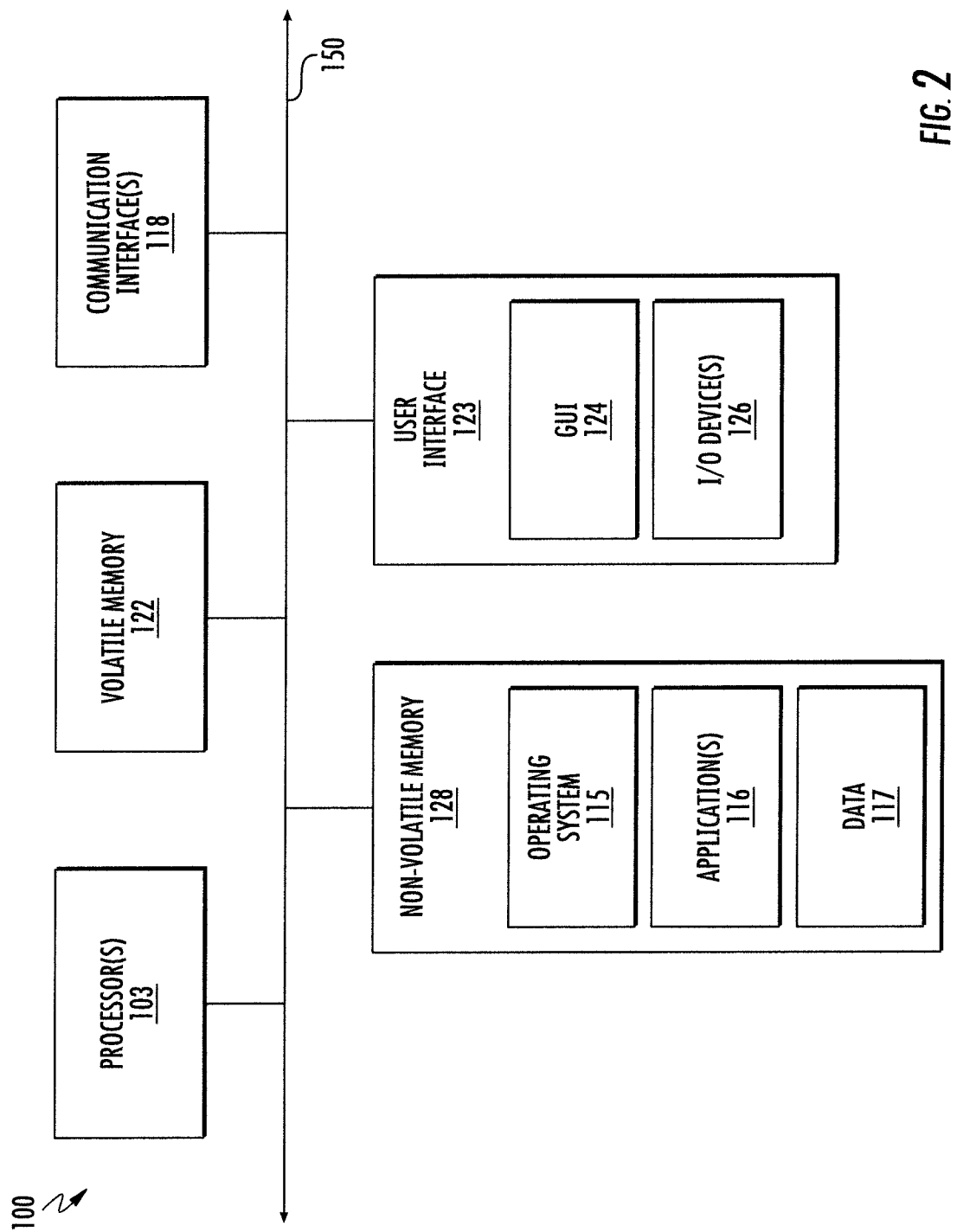
FIG. 2 is a schematic block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150. The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
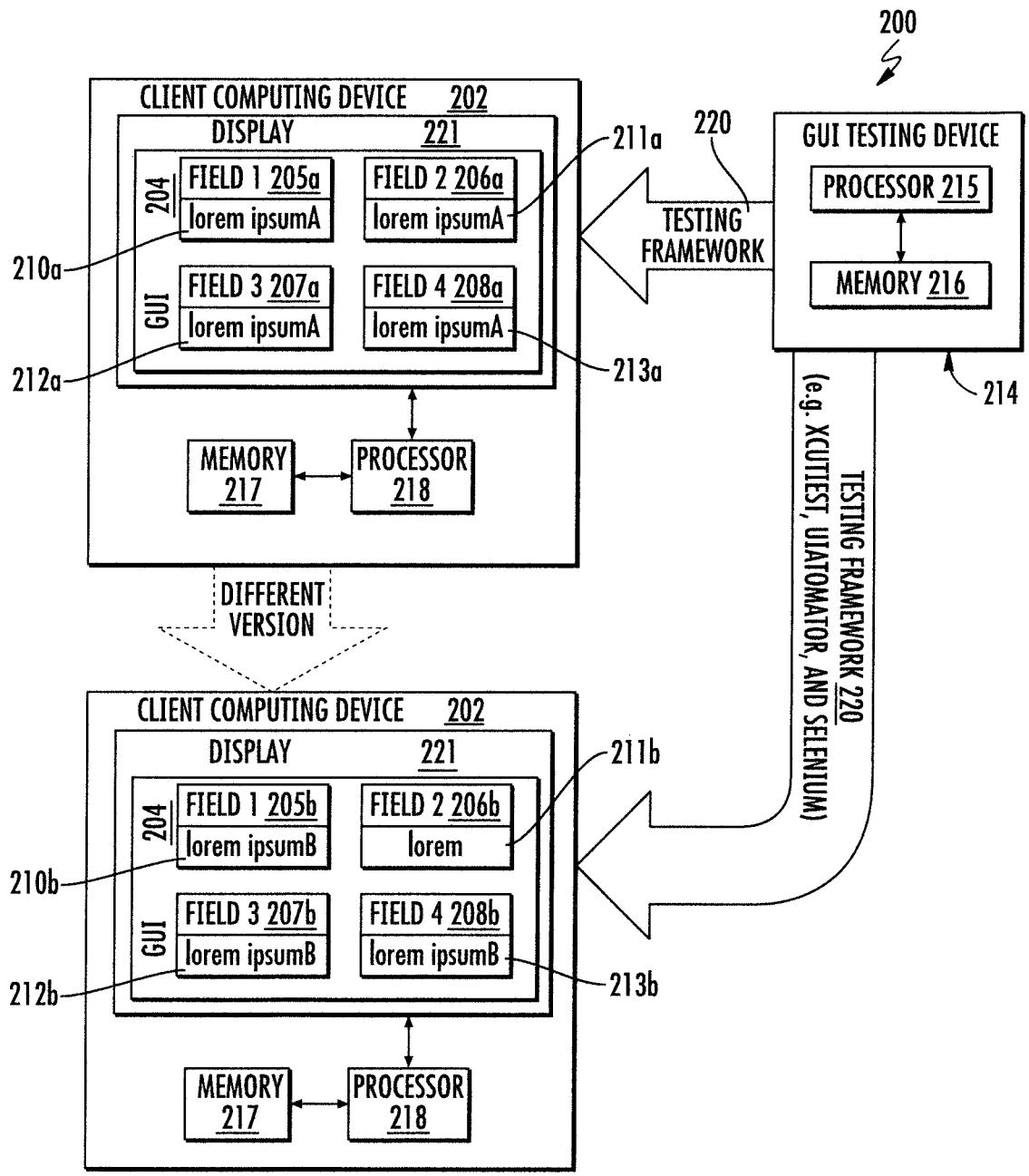
FIG. 3 is a schematic block diagram of a computing system that includes a GUI testing device, according to the present disclosure.
Figure 4:
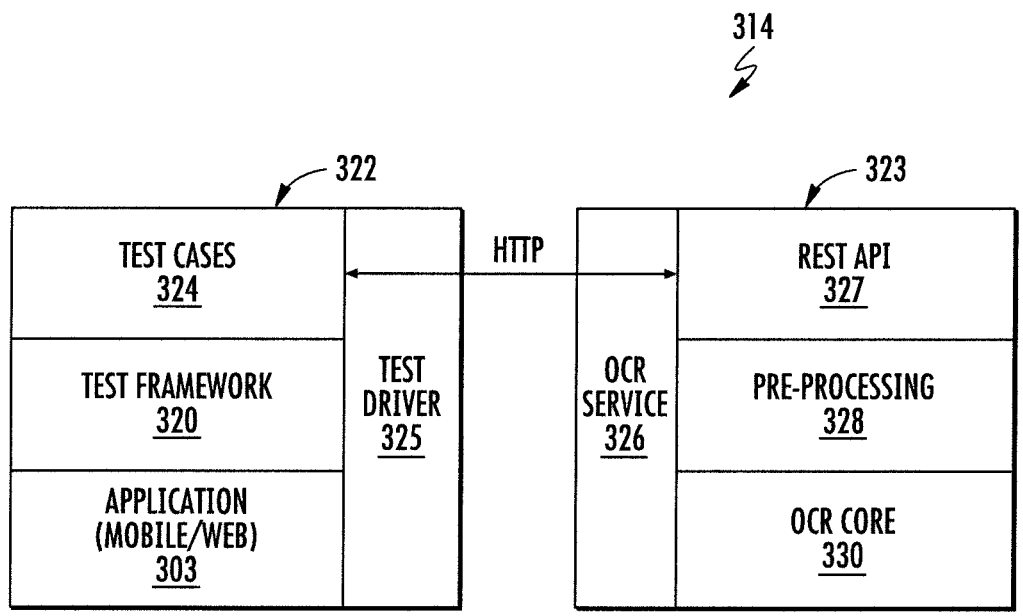
FIG. 4 is a schematic block diagram of another embodiment of the GUI testing device from FIG. 3.
Figure 6:
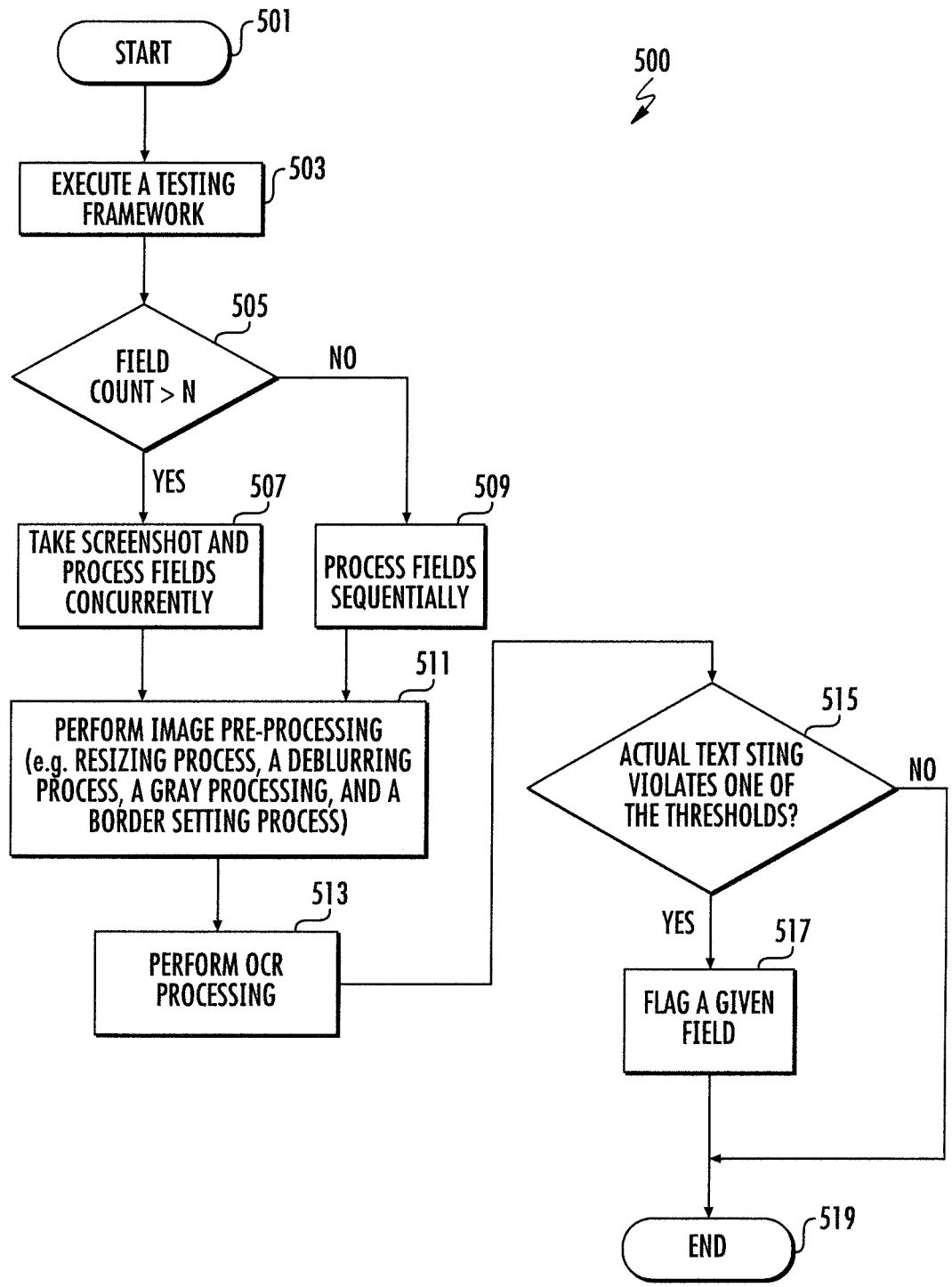
FIG. 6 is a flowchart of a method for operating an example embodiment of the computing system of FIG. 3.

Referring now to FIGS. 3 and 6, and to a flowchart 500 therein, a computing system 200 according to the present disclosure, and a method for operating the computing system are now described. (Block 501). The computing system 200 illustratively includes a client computing device 202 comprising a memory 217, a processor 218 coupled to the memory, and a display 221 coupled to the processor. The client computing device 202 is configured to execute a software application (303: FIG. 4) with an associated GUI 204 on the display 221. The software application may comprise a native mobile OS application, or a web browser based application.

The GUI 204 illustratively includes a plurality of fields 205a-208a, 205b-208b. Each of the plurality of fields 205a-208a, 205b-208b is to hold a text string generated by the software application. The software application is configured to support providing output in the plurality of fields 205a-208a, 205b-208b in a plurality of different languages (e.g. English, Mandarin, Japanese, Russian, or Korean).

The computing system 200 illustratively includes a GUI testing device 214 in communication with the client computing device 202 and comprising a processor 215, and a memory 216 coupled to the processor. The GUI testing device 214 is configured to execute a testing framework 220 for interacting with the software application to generate a plurality of versions of the GUI 204. (Block 503). The testing framework 220 may include at least one of XCUITest, UIAutomator, and Selenium, for example. Of course, this listing is merely exemplary, and other testing framework applications can be used.

As will be appreciated, the testing framework 220 comprises an iterator function to run the software application through multiple operation scenarios, thereby producing a set of expected text values for each field 205a-208a, 205b-208b for each operation scenario. In other words, the expected text values equate to the computational output of the software application.

Each of the plurality of versions is in a different language, and defines a plurality of expected text strings in the plurality of fields 205a-208a, 205b-208b. The GUI testing device 214 is configured to extract the plurality of fields 205a-208a from the plurality of versions of the GUI 204. In particular, the GUI testing device 214 is configured to generate image data for each field in the plurality of fields 205a-208a from the plurality of versions of the GUI 204.

The GUI testing device 214 is configured to perform OCR processing on the image data from the extracted plurality of fields to generate a plurality of actual text strings 210a-213a, 210b-213b and compare the plurality of actual text strings with the plurality of expected text strings. (Block 513). Whereas the expected text values equate to the computational output of the software application, the actual text values are the output actually presented on the display 221 of the client computing device 202. In other words, the GUI testing device 214 is comparing what the software application was supposed to output to what was actually outputted by the software application.

In particular, the GUI testing device 214 is configured to flag a given field when a given actual text string 210a-213a, 210b-213b is greater than a given expected text string by a first threshold percentage, for example, actual text string 211*b* in the illustrated embodiment. Also, the GUI testing device 214 is configured to flag a given field when the given actual text string 210*a*-213*a*, 210*b*-213*b* is less than the given expected text string by a second threshold percentage, for example, actual text string 212*b* in the illustrated embodiment. (Blocks 515, 517, 519). In some embodiments, the first and second thresholds may be equal (e.g. range of 10%-20%). In other embodiments, the first and second thresholds may be different.

Indeed, in the illustrated example, the first version of the GUI 204 produces the actual text strings 210*a*-213*a* within expected text sizing parameters. In other words, the actual text strings 210*a*-213*a* fit properly in their respective fields 205*a*-208*a*, i.e. no overlap, no truncation, etc. On the other hand, the second version of the GUI 204 produces the actual text strings 210*b*-213*b* outside expected text sizing parameters. Here, some 211*b*, 212*b* of the actual text strings 210*b*-213*b* do not fit properly in their respective fields 205*b*-208*b*.

In this illustrated embodiment, the GUI testing device 214 comprises a single device performing both the testing framework 220 and the OCR processing. In other embodiments (FIGS. 4-5), the GUI testing device 214 comprises a plurality of processing devices, and the OCR processing is performed by a computing device separate from the device executing the testing framework 220.

In some applications, the GUI testing device 214 is configured to, for each version of the GUI, extract, and perform OCR processing on each actual text string 210*a*-213*a*, 210*b*-213*b* sequentially. (Blocks 505, 509). More specifically, this is for when the plurality of fields 205*a*-208*a*, 205*b*-208*b* in the GUI 204 is greater than a numerical threshold (N).

For these high volume applications, the GUI testing device 214 is configured to, for each version of the GUI, generate a screenshot (i.e. an image of the entire GUI 204) of a respective version of the GUI 204. (Blocks 505, 507). Before the entire screenshot can be processed for OCR, the GUI testing device 214 is configured to perform an element frame detect function to parse the screenshots for the plurality of fields 205*a*-208*a*, 205*b*-208*b*. In particular, the location of each of the plurality of fields 205*a*-208*a*, 205*b*-208*b* is determined (e.g. the first field 205*a* is located at 5, 5 and 15, 10 (x position, y position pixel locations of diagonal corners of the given field), or comprises a field with upper left corner at 5, 5 with a width of 10 pixels and a height of 5 pixels).

Once the location of each of the plurality of fields 205*a*-208*a*, 205*b*-208*b* is determined, the screenshot and location data is passed on for OCR processing. In other words, the OCR processing only involves the desired text in the plurality of fields 205*a*-208*a*, 205*b*-208*b*. This high volume feature can also be used to improve performance when the iterator function of the testing framework 220 has less than ideal performance.

When the plurality of fields 205*a*-208*a*, 205*b*-208*b* in the GUI 204 is less than the numerical threshold (N), the GUI testing device 214 is configured to, for each version of the GUI, extract, and perform OCR processing concurrently on the plurality of actual text strings 210*a*-213*a*, 210*b*-213*b* in the plurality of fields 205*a*-208*a*, 205*b*-208*b*. Here, the GUI testing device 214 is also configured to, for each version of the GUI, generate a screenshot (i.e. an image of the entire GUI 204) of a respective version of the GUI 204, and the entire screenshot is passed on for OCR processing.

Moreover, to reduce processing time for the OCR step, the GUI testing device 214 is configured to use the plurality of expected text strings to whitelist (i.e. filter) discovered fields in the screenshot. Helpfully, the GUI testing device 214 may avoid performing OCR processing on text outside of the plurality of fields 205*a*-208*a*, 205*b*-208*b*, which will speed up the processing time.

The GUI testing device 214 is configured to perform image pre-processing on the extracted plurality of fields from the plurality of versions of the GUI. (Block 511). For example, the image pre-processing may include at least one of a resizing process, a deblurring process, a gray processing, and a border setting process. In particular, the image pre-processing formula is customized based upon the image characteristics of the GUI 204. The image characteristics may comprise one or more of resolution, image quality, and text font. Indeed, in some embodiments, the GUI testing device 214 is configured to selectively adjust the image pre-processing for each OCR operation, which can be a whole screen shot, or an individual one of the plurality of fields 205*a*-208*a*, 205*b*-208*b*. As will be appreciated, the upstream image pre-processing enhances the accuracy of the subsequent OCR processing.

After the GUI testing device 214 has processed the desired plurality of fields 205*a*-208*a*, 205*b*-208*b*, the GUI testing device 214 is configured to output a listing of the flagged fields for the user/designer to review. The listing may include a breakdown of the flagged fields and respective GUI version, i.e. the language version.

Another aspect is directed to a non-transitory computer-readable medium for a GUI testing device 214 in communication with a client computing device 202. The client computing device 202 is configured to execute a software application (303: FIG. 4) with an associated GUI 204. The GUI 204 comprises a plurality of fields 205*a*-208*a*, 205*b*-208*b*, each field to hold a text string. The non-transitory computer-readable medium has computer-executable instructions for causing the GUI testing device 214 to perform steps. The steps include executing a testing framework 220 for interacting with the software application to generate a plurality of versions of the GUI 204, each of the plurality of versions being in a different language, and defining a plurality of expected text strings in the plurality of fields 205*a*-208*a*, 205*b*-208*b*. The steps also include extracting the plurality of fields 205*a*-208*a*, 205*b*-208*b* from the plurality of versions of the GUI 204, performing OCR processing on the plurality of fields 205*a*-208*a*, 205*b*-208*b* to generate a plurality of actual text strings 210*a*-213*a*, 210*b*-213*b*, and comparing the plurality of actual text strings with the plurality of expected text strings.

In the illustrated embodiment, the software application is executed by the client computing device 202. In other embodiments, the software application may be executed on a remote server as a web/cloud application, and the GUI testing device 214 interacts with the software application over a network connection, such as the Internet. In other words, there client computing device 202 would be omitted in this embodiment.

As will be appreciated, testing for the software application (303: FIG. 4) on the client computing device 202 can be laborious. Typically, the testing process requires a large number of operation scenarios that must be run on the software application. As noted above, the testing framework 220 may provide a less laborious approach to this testing. Nevertheless, the testing framework 220 is typically used to detect functional issues, for example, the software application producing an erroneous result, i.e. an erroneous expected text string. It can be difficult for a designer of the software application to detect GUI issues, such as when the software application displays a correct result in a text field, but the text field truncates the correct result, or the text field is too large for the correct result. These scenarios provide for a less than desirable GUI experience for user.

These GUI issues are even more difficult to detect when the application is deployed in a plurality of different languages. For example, the correct result may display well in English, but may become truncated when translated into Mandarin, Japanese, Russian, or Korean. In one problem instance, a text field may expand automatically to fit a translated result, but may then overlap another adjacent text field.

Advantageously, the GUI testing device 214 may identify problematic fields in the GUI of the software application by running the needed permutations in multiple languages. Moreover, instead of a laborious review process, the GUI testing device 214 utilizes OCR technology to flag problematic text fields for the designed to review.

Figure 5:
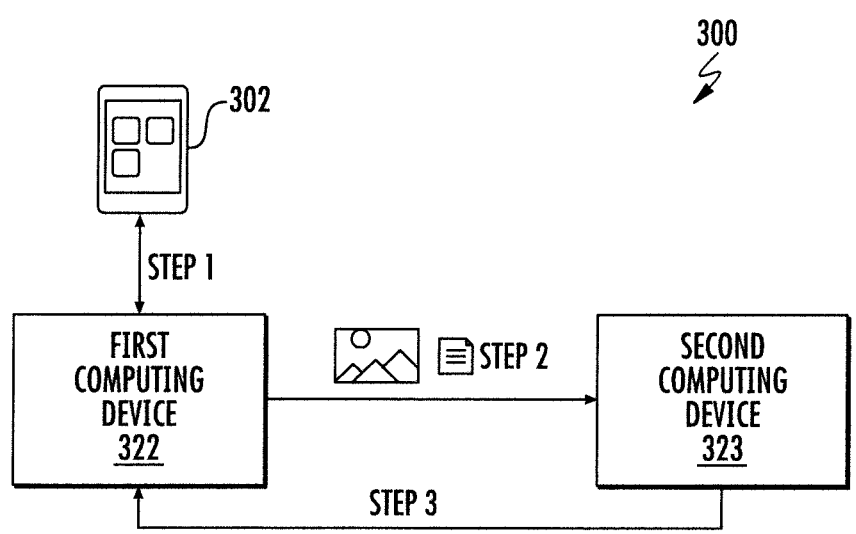
FIG. 5 is a schematic block diagram of another embodiment of the computing system of FIG. 3.

Referring now additionally to FIGS. 4-5, another embodiment of the computing system 300 is now described. In this embodiment of the computing system 300, those elements already discussed above with respect to FIGS. 1-3 are incremented by 300 and most require no further discussion herein. This embodiment differs from the previous embodiment in that this computing system 300 illustratively includes the GUI testing device 314 comprising a first computing device 322, and a second computing device 323 separate from and in communication with the first computing device.

The first computing device 322 includes a test drive module 325 configured to execute the testing framework 320. As will be appreciated, the testing framework 320 executes a plurality of test cases 324 for testing the software application 303. The first computing device 322 is configured to extract the plurality of fields, and compare plurality of actual text strings with the plurality of expected text strings.

The second computing device 323 is a special purpose OCR device in the illustrated embodiment. Also, the second computing device 323 may be remote to the first computing device 322, for example, a cloud computing server, or may be communicating over a LAN.

The second computing device 323 includes an OCR service module 326 configured to execute a pre-processing module 328 for image pre-processing on the extracted plurality of fields from the plurality of versions of the GUI. The OCR service module 326 is configured to execute an OCR core 330 for performing the OCR processing on the plurality of fields. The OCR service module 326 configured to execute a rest application protocol interface (API) 327 configured to provide the communication connect with the first computing device 322. In the illustrated embodiment, the rest API 327 communication comprises a Hypertext Transfer Protocol (HTTP) link. Of course, this is merely an exemplary protocol and other communication protocol links can be used.

In the illustrated embodiment, the first computing device 322 is coupled to the client computing device 302 for testing the software application 303 executed by the client computing device. The coupling between the client computing device 302 and the first computing device 322 may comprise a wired connection, such as a universal serial bus (USB) connection, for example, but may also comprise a wireless connection, such as a Bluetooth Connection.

Of course, this disclosed division of functionality between the first computing device 322 and the second computing device 323 is exemplary, and other arrangements of functionality are possible. For example, the comparing and flagging steps could be performed remotely at the second computing device 323.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A computing system comprising:
   a client computing device configured to execute a software application with an associated graphical user interface (GUI), the GUI comprising a plurality of fields, each field to hold a text string; and
   a GUI testing device in communication with said client computing device and configured to
      execute a testing framework for interacting with the software application to generate a plurality of versions of the GUI, each of the plurality of versions being in a different spoken communication language, and defining a plurality of expected text strings in the plurality of fields,
      extract the plurality of fields from the plurality of versions of the GUI,
      perform optical character recognition (OCR) processing on the plurality of fields to generate a plurality of actual text strings, and
      compare the plurality of actual text strings with the plurality of expected text strings.

2. The computing system of claim 1 wherein said GUI testing device is configured to flag a given field when a given actual text string is greater than a given expected text string by a first threshold percentage, or when the given actual text string is less than the given expected text string by a second threshold percentage.

3. The computing system of claim 1 wherein said GUI testing device is configured to, for each version of the GUI, extract, and perform OCR processing on each actual text string sequentially.

4. The computing system of claim 1 wherein said GUI testing device is configured to, for each version of the GUI, extract, and perform OCR processing concurrently on the plurality of actual text strings in the plurality of fields.

5. The computing system of claim 4 wherein said GUI testing device is configured to, for each version of the GUI, generate a screenshot of a respective version of the GUI.

6. The computing system of claim 1 wherein said GUI testing device is configured to perform image pre-processing on the extracted plurality of fields from the plurality of versions of the GUI.

7. The computing system of claim 6 wherein the image pre-processing comprises at least one of a resizing process, a deblurring process, a gray processing, and a border setting process.

8. The computing system of claim 1 wherein said GUI testing device comprises a first computing device, and a second computing device separate from and in communication with said first computing device; wherein said first computing device is configured to execute the testing framework, extract the plurality of fields, and compare plurality of actual text strings with the plurality of expected text strings; and wherein said second computing device is configured to perform the OCR processing on the plurality of fields.

9. The computing system of claim 1 wherein the testing framework comprises at least one of XCUITest, UIAutomator, and Selenium.

10. A graphical user interface (GUI) testing device in communication with a software application with an associated GUI, the GUI comprising a plurality of fields, each field to hold a text string, the GUI testing device comprising:
a processor and a memory cooperating therewith and configured to
execute a testing framework for interacting with the software application to generate a plurality of versions of the GUI, each of the plurality of versions being in a different spoken communication language, and defining a plurality of expected text strings in the plurality of fields,
extract the plurality of fields from the plurality of versions of the GUI,
perform optical character recognition (OCR) processing on the plurality of fields to generate a plurality of actual text strings, and
compare the plurality of actual text strings with the plurality of expected text strings.

11. The GUI testing device of claim 10 wherein said processor and memory are configured to flag a given field when a given actual text string is greater than a given expected text string by a first threshold percentage, or when the given actual text string is less than the given expected text string by a second threshold percentage.

12. The GUI testing device of claim 10 wherein said processor and memory are configured to, for each version of the GUI, extract, and perform OCR processing on each actual text string sequentially.

13. The GUI testing device of claim 10 wherein said processor and memory are configured to, for each version of the GUI, extract, and perform OCR processing concurrently on the plurality of actual text strings in the plurality of fields.

14. A non-transitory computer-readable medium for a graphical user interface (GUI) testing device in communication with a software application being executed with an associated GUI, the GUI comprising a plurality of fields, each field to hold a text string, the non-transitory computer-readable medium having computer-executable instructions for causing the GUI testing device to perform steps comprising:
executing a testing framework for interacting with the software application to generate a plurality of versions of the GUI, each of the plurality of versions being in a different spoken communication language, and defining a plurality of expected text strings in the plurality of fields;
extracting the plurality of fields from the plurality of versions of the GUI;
performing optical character recognition (OCR) processing on the plurality of fields to generate a plurality of actual text strings; and
comparing the plurality of actual text strings with the plurality of expected text strings.

15. The non-transitory computer-readable medium of claim 14 wherein the steps include flagging a given field when a given actual text string is greater than a given expected text string by a first threshold percentage, or when the given actual text string is less than the given expected text string by a second threshold percentage.

16. The non-transitory computer-readable medium of claim 14 wherein the steps include, for each version of the GUI, extracting, and performing OCR processing on each actual text string sequentially.

17. The non-transitory computer-readable medium of claim 14 wherein the steps include, for each version of the GUI, extracting, and performing OCR processing concurrently on the plurality of actual text strings in the plurality of fields.

18. The non-transitory computer-readable medium of claim 17 wherein the steps include, for each version of the GUI, generating a screenshot of a respective version of the GUI.

19. The non-transitory computer-readable medium of claim 14 wherein the steps include performing image pre-processing on the extracted plurality of fields from the plurality of versions of the GUI.

20. The non-transitory computer-readable medium of claim 19 wherein the image pre-processing comprises at least one of a resizing process, a deblurring process, a gray processing, and a border setting process.

21. The non-transitory computer-readable medium of claim 14 wherein said GUI testing device comprises a first computing device, and a second computing device separate from and in communication with said first computing device; wherein said first computing device is configured to execute the testing framework, extract the plurality of fields, and compare plurality of actual text strings with the plurality of expected text strings; and wherein said second computing device is configured to perform the OCR processing on the plurality of fields.

22. A method for operating a graphical user interface (GUI) testing device communicating with a software application being executed with an associated GUI, the GUI comprising a plurality of fields, each field to hold a text string, the method comprising:
executing a testing framework for interacting with the software application to generate a plurality of versions of the GUI, each of the plurality of versions being in a different spoken communication language, and defining a plurality of expected text strings in the plurality of fields;
extracting the plurality of fields from the plurality of versions of the GUI;
performing optical character recognition (OCR) processing on the plurality of fields to generate a plurality of actual text strings; and
comparing the plurality of actual text strings with the plurality of expected text strings.

23. The method of claim 22 further comprising flagging a given field when a given actual text string is greater than a given expected text string by a first threshold percentage, or when the given actual text string is less than the given expected text string by a second threshold percentage.

24. The method of claim 22 further comprising, for each version of the GUI, extracting, and performing OCR processing on each actual text string sequentially.

* * * * *